US008654964B1

(12) United States Patent
Noble, Jr. et al.

(10) Patent No.: US 8,654,964 B1
(45) Date of Patent: Feb. 18, 2014

(54) AGENT-CENTRIC PROCESSING OF PRIORITIZED OUTBOUND CONTACT LISTS

(71) Applicant: Noble Systems Corporation, Atlanta, GA (US)

(72) Inventors: James K. Noble, Jr., Marietta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/705,555

(22) Filed: Dec. 5, 2012

(51) Int. Cl.
*H04M 3/00* (2006.01)
*H04M 5/00* (2006.01)

(52) U.S. Cl.
USPC ................................ 379/265.01; 379/266.01

(58) Field of Classification Search
USPC ........................................ 379/265.01–266.01
See application file for complete search history.

(56) References Cited

U.S. PATENT DOCUMENTS

| | | | |
|---|---|---|---|
| 5,802,161 A | | 9/1998 | Svoronos et al. |
| 6,147,977 A | * | 11/2000 | Thro et al. .................... 370/265 |
| 6,519,335 B1 | | 2/2003 | Bushnell |
| 6,798,876 B1 | | 9/2004 | Bala |
| 7,184,540 B2 | | 2/2007 | Dezonno et al. |
| 8,054,965 B1 | * | 11/2011 | Wu et al. ................... 379/265.11 |
| 2009/0190740 A1 | | 7/2009 | Chishti et al. |
| 2009/0190744 A1 | | 7/2009 | Xie et al. |
| 2009/0190745 A1 | | 7/2009 | Xie et al. |
| 2009/0190747 A1 | | 7/2009 | Spottiswoode |
| 2009/0190748 A1 | | 7/2009 | Chishti et al. |
| 2009/0190749 A1 | | 7/2009 | Xie et al. |
| 2009/0190750 A1 | | 7/2009 | Xie et al. |
| 2009/0232294 A1 | | 9/2009 | Xie et al. |
| 2009/0323921 A1 | | 12/2009 | Spottiswoode et al. |
| 2010/0020961 A1 | | 1/2010 | Spottiswoode |
| 2010/0111286 A1 | | 5/2010 | Chishti |
| 2010/0111287 A1 | | 5/2010 | Xie et al. |
| 2010/0111288 A1 | | 5/2010 | Afzal et al. |
| 2010/0142698 A1 | | 6/2010 | Spottiswoode et al. |
| 2012/0027197 A1 | * | 2/2012 | Zgardovski et al. ..... 379/266.07 |

* cited by examiner

*Primary Examiner* — Quynh Nguyen

(57) ABSTRACT

Outbound contact records for a contact center can be arranged as an ordered list reflecting a priority for reaching a party during defined time periods. For each time period, the corresponding prioritized list is used for originating outbound contacts. Originating outbound contacts involves first determining when an agent is available and determining an agent profile of the available agent. Then, records in the ordered list are searched to identify parties having a compatible called party profile matching the agent profile. When an agent is available, the selected contact records are used to generate outbound contacts and a responding party is matched to the agent. Other responding parties may be matched with other agents having the same agent profile or matched with second-best compatible agents. At certain conditions, the remaining records may be processed in a list-centric manner wherein a responding party is matched with any available agent.

20 Claims, 9 Drawing Sheets

| Row | Number | 10:00 a.m. | 11:00 a.m. | 12:00 p.m. | 1:00 p.m. | 2:00 p.m. | 3:00 p.m. |
|---|---|---|---|---|---|---|---|
| 1 | 404-555-1234 | 1 _202_ | 2 _203_ | 9 _205_ | 5 _207_ | 4 _209_ | 6 _211_ |
| 2 | 404-555-2345 | 10 | 5 | 1 _206_ | 8 | 10 | 3 |
| 3 | 404-555-3456 | 3 | 10 | 6 | 2 | 8 | 1 _212_ |
| 4 | 404-555-4567 | 8 | 1 _204_ | 3 | 6 | 9 | 9 |
| 5 | 404-555-5678 | 5 | 6 | 4 | 7 | 5 | 7 |
| 6 | 404-555-6789 | 6 | 3 | 7 | 4 | 2 | 10 |
| 7 | 404-555-7890 | 7 | 9 | 2 | 1 _208_ | 6 | 4 |
| 8 | 404-555-8901 | 4 | 7 | 8 | 9 | 1 _210_ | 8 |
| 9 | 404-555-9012 | 9 | 4 | 10 | 10 | 3 | 5 |
| 10 | 404-556-0123 | 2 | 8 | 5 | 3 | 7 | 2 |

FIG. 2

AGENT-CENTRIC PROCESSING OF PRIORITIZED OUTBOUND CONTACT LISTS

BACKGROUND

Outbound contact centers originate communications to individuals for various purposes, ranging from telemarketing to dept collection. For maximum effectiveness, the contacted party frequently interacts with an agent, as opposed to, e.g., an interactive voice response unit. Regardless of what criteria are used to define a successful or optimal outcome for the contact, it is not surprising that the skills of the agent greatly impact the outcome of the contact. Further, other factors may be involved in contributing to an optimized contact between the agent and the contacted party. These factors may involve matching various characteristics, such as personality and demographic characteristics, between the agent and the contacted party.

Matching the contacted party's characteristics with the agent's characteristics can result in an affinity between the two that further optimizes the contact. Such matching may be based on personality, demographics, native language or dialects, ethnic background, age, or other criteria. However, these relationship affinity matchings rely on the conventional call center techniques of matching a contacted party of an outbound initiated call with an available agent. For example, several outgoing calls may be initiated by the contact center wherein the first answered call is then connected to the most appropriate, available agent. However, the most appropriate and available agent may not necessarily be the most appropriate agent, as the most appropriate agent may not be available. Thus, an optimized matching between the contacted party and the agent is not likely to occur.

Further, calls are typically originated during a call center shift which may not necessarily reflect the best time to call that party. Thus, there is no assurance that when the communication using the contact record is originated, the desired contact person will be contacted, nor that the best agent to handle the communication will be available.

Thus, a mechanism is required that ensures parties to be contacted are matched with the most appropriate agent. It is with these and other considerations that the technologies and techniques disclosed here are presented.

BRIEF SUMMARY

Technologies are generally presented herein pertaining to processing of outbound contact lists in a contact center. More specifically, in one embodiment technologies are presented herein for selecting records in the outbound contact list to originate outbound communications to contacted parties in a manner that optimizes the interaction between the contacted party and a contact center agent. The agent is determined to have certain characteristics, maintained in what is called an agent profile, which is established before the agent handles any outbound communications. Each contacted party in the outbound contact list is further associated with another set of characteristics, maintained in what is called a contacted party profile or party profile, which is also established before that party is contacted. Once an agent is available, the agent's profile is used to identify compatible parties in the outbound contact list forming an attempt group which is then selected to originate outbound contacts. A responding party is then connected with the available agent. Compatible parties for an agent are determined by matching at least one characteristic in the party profile with at least one characteristic in the agent profile. This form of matching an agent with a contacted party may be termed "agent-centric" in that potential contacted parties are determined based on available agents to optimize the interaction. Further, different levels of matching can be defined for selecting contact records, such as those having a "best match" or a "second-best match."

In one embodiment, the outbound contact list may be prioritized based on an outbound contact list and a priority matrix. The priority matrix indicates a prioritized order for the outbound parties for a plurality of time periods. The outbound contact list and priority matrix can be processed to generate a plurality of outbound contact lists for a corresponding number of time periods. Each of the outbound contact lists can then be used for originating calls for the agents as indicated above via the agent-centric procedures during the respective time period.

The subject matter disclosed herein may be implemented in various forms, including as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 2 illustrates one embodiment of a contact list and a priority matrix;

DETAILED DESCRIPTION

Figure 1:
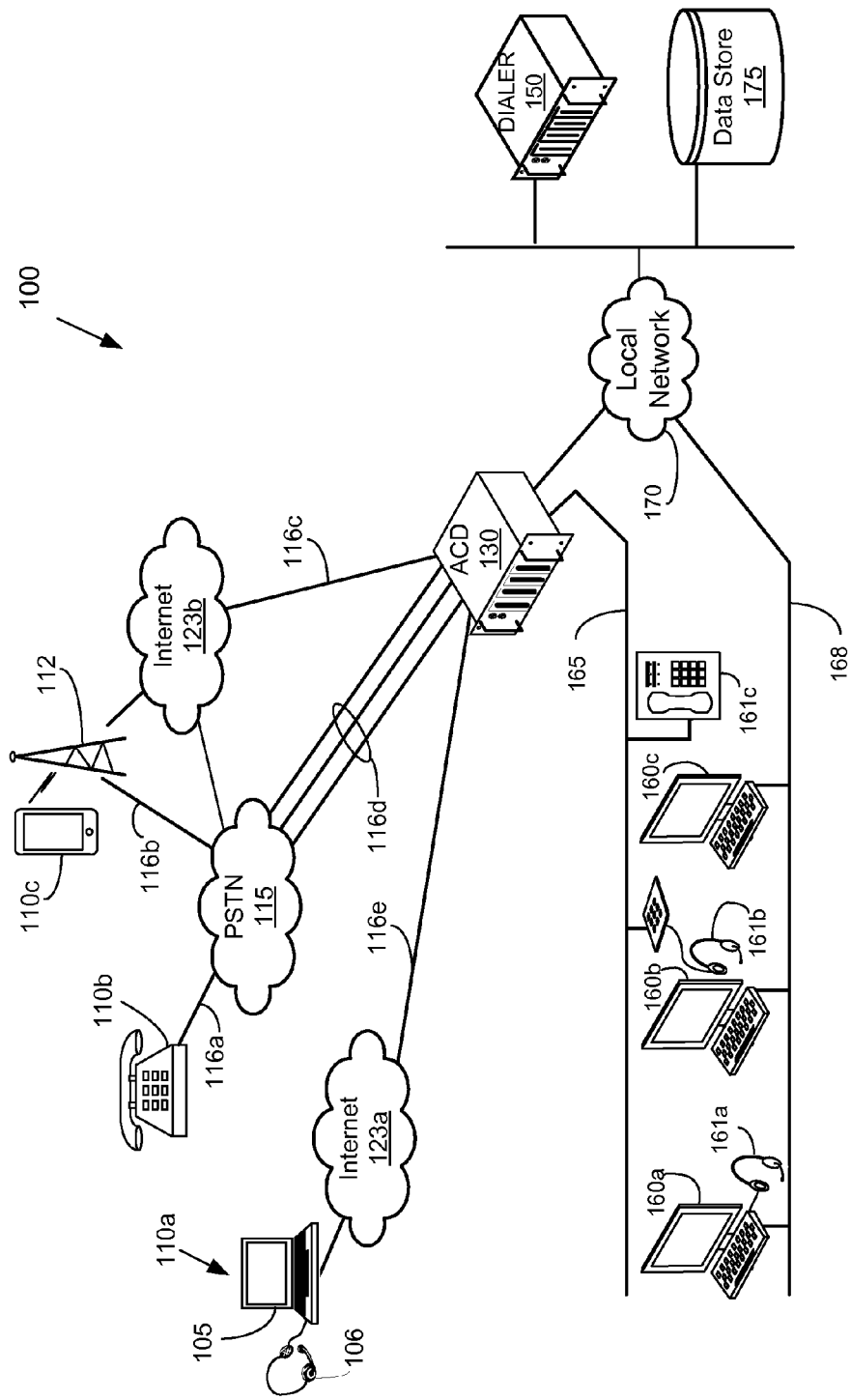
FIG. 1 shows one conceptual illustration of an exemplary contact center that may incorporate the technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Technologies are generally presented herein pertaining to processing of outbound contact lists in a contact center by matching an available agent with a contacted individual for optimal results. In one embodiment, this involves determining a best time to contact the contacted party by developing a prioritized list for a given time period, and then selecting contact records where the party's profile optimally matches that of the agent's profile.

More specifically, in one embodiment technologies are presented herein for selecting records in the outbound contact list to originate outbound communications to contacted parties in a manner that optimizes the interaction between the contacted party and a contact center agent. The agent is determined to have certain characteristics, maintained in what is called an agent profile, which is established before the agent handles any outbound communications. Each contacted party is further associated with another set of characteristics, maintained in what is called a contacted party profile or party profile, which is also established before that party is contacted. Once an agent is available, compatible parties in the outbound contact list are searched and selected to form an attempt group. Compatible parties for an agent are determined by matching characteristics found in the party profile with characteristics found in the agent profile. Outbound communications are originated using the attempt group, and the initial answering or responding party is then connected with the available agent. Because the contact records in the attempt group were selected to be compatible with that agent, the initial answering party is ensured to be optimally compatible with the agent. This form of matching an agent with a contacted party may be termed "agent-centric" in that potential contacted parties are determined based on available agents to optimize the interaction. This may be in contrasted to conventional "list-centric" processing where potential agents are determined based on the answered party or wherein no consideration is given to matching the contacted party with an agent based on profile(s).

In one embodiment, the outbound contact list may be prioritized to reflect the best time to call a party based on an outbound contact list and a priority matrix. The priority matrix indicates a prioritized order for the outbound parties for a plurality of time periods. The outbound contact list and priority matrix can be processed to generate a plurality of outbound contact lists for a corresponding number of time periods. Each of the outbound contact lists can then be used for originating calls for the agents as indicated above via the agent-centric procedures during the respective time period.

Exemplary Contact Center Architecture

FIG. 1 shows one embodiment of a call center architecture 100 illustrating the various technologies disclosed herein. The call center shown in FIG. 1 may process voice calls that are outbound-only, or a combination of both inbound and outbound (sometimes referred to as a "blended" call center). Although many aspects of call center operation is disclosed in the context of voice calls, the call center may process other forms of communication such as facsimiles, emails, text messages, video calls, chat messages, and other forms.

Inbound voice calls may originate from calling parties using a variety of phone types. Similarly, outbound voice calls may originate to a variety of phone types. A contacted party may be using a conventional analog telephone 110b connected to a public switched telephone network ("PSTN") 115 using an analog plain old telephone service ("POTS") line 116a. The calls may be routed by the PSTN 115 and may comprise various types of facilities 116d.

Voice calls may also involve a mobile device 110c, such as a smart phone or tablet, which wirelessly communicates with a mobile service provider ("MSP") 112. The voice calls may be routed by the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" as referred to herein is not limited to time-division multiplexing ("TDM") technology.

Voice calls may also involve a calling party employing a so-called "IP phone," "VoIP phone," or "soft phone" 110a. In one embodiment, this device may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

Inbound calls from callers to the call center may be received at an automatic call distributor ("ACD") 130. The ACD 130 may be a specialized switch for receiving and routing inbound calls under various conditions. The ACD 130 may route an incoming call over call center facilities 165 to an available agent. The facilities 165 may be any suitable technology for conveying the call, including, but not limited to, a local area network ("LAN"), wide area network ("WAN"), ISDN, or conventional TDM circuits. The facilities 165 may be the same or different from the facilities used to transport the call to the ACD 130. The ACD 130 may also communicate using data communication facilities 168, using a local network 170 for communicating data with each computer 160a-160c.

A dialer 150 may be used to originate outbound calls to individuals identified on a contact list. The dialer 150 may be connected via trunks or other facilities directly, or it may interface and direct other components to originate calls, such as the ACD 130 in FIG. 1 or a PBX (not shown in FIG. 1). Various combinations are possible for interfacing a dialer 150 with communication facilities for accomplishing outbound calls.

Inbound and outbound calls may be routed over facilities 165 to an agent for servicing. That is, the party may speak with an agent for receiving, for example, customer service. The physical area at which the agent sits is often referred to as an agent "position" and these positions are often grouped into clusters in a call center that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, though separate devices may be used. In some instances, "workstation" may be used in reference to either the data or voice capability at the agent's position, as appropriate to the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be a virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

An agent typically logs onto their workstation prior to handling calls. This allows the call center to know which agents are available for handling calls. The ACD 130 may also maintain data of an agent's skill level that is used to route a specific call to the agent, or group of agents having the same skill level.

Various data may be stored in the data store 175, including for example, profiles of agents, profiles of parties in the contact lists, contact lists themselves, priority indications, and other related data as will be seen. The data store 175 may be stored in various ways across a plurality of storage systems, including in a distributed manner that may be incorporated within the dialer 150 and/or ACD 130. Various embodiments are possible and FIG. 1 only illustrates one embodiment.

Although the above components may be variously referred to as "servers," each may be also referred to as a "processing device," "unit," "component" or "system" and may incorporate a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein. In addition, the call center architecture 100 may be provided as a hosted solution, where the call processing functionality is provided as a communication service (a so-called "communication as a service" or "CaaS") to a call center operator. Thus, there is no requirement that the components identified above actually be located or controlled by a call center operator.

In addition, the agent positions can be co-located in a single physical call center or in multiple physical call centers. The agents can be remotely located from the other components of the call center, and may also be remotely located from each other, sometimes referred to as a "virtual call center." A virtual call center may describe a scenario where agents work at home, using their own computers and telephones as workstations. In some configurations, a single physical location of the call center may not be readily identifiable. This may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, configuration, facilities, technologies, and equipment used. Other equipment may typically be used, but are not shown as such equipment is not necessary to illustrate the concepts and technologies disclosed herein.

Prioritized Contact Lists

Various techniques are known in the art for prioritizing dialing lists. These techniques may be based on the best time to call ("BTTC") a contact, the value of the contact, and resources required to reach the contact. One such technique is described in U.S. Pat. No. 5,802,161, entitled "Method and System for Optimized Scheduling", the contents of which are incorporated by reference. In certain instances, the determination of the priority for a set of parties in a contact list can be expressed as a priority matrix. The priority matrix indicates the priorities for contacting each party in the contact list by indicating a priority order for the set of contact records for a plurality of time periods. The priority order can reflect various factors used by the call center to determine which contact has priority. The contact device, such as an outbound dialer or email server, receives the priority matrix and originates outbound contacts in an appropriate manner.

An example of one embodiment of a priority matrix for illustrating its usage and structure is provided in FIG. 2. Although this and other examples herein are provided in the context of dialing a telephone call as the outbound contact, the principles are applicable to initiating other forms of communication, including contact devices in call centers that initiate contact via email, Internet chat, texting, or other forms.

Turning to FIG. 2, a priority data structure 200 comprises a contact list of contact addresses (e.g., telephone numbers) from contact records as is shown in the initial column 250. Although only ten contact addresses are shown, typical embodiments of an outbound list may include many more, often involving thousands of contact addresses. Further, there may be other fields included in the data structure 200 that are associated with each record but that are not shown and are not necessary to illustrate the principles disclosed herein. The list of telephone numbers is sorted in ascending order for convenience, although this may not be the case in other embodiments.

The other columns 260 illustrate a priority matrix that is organized by column as a series of time periods, which in this embodiment are in one hour intervals. These contiguous time intervals begin with 10:00 a.m. and go through 3:00 p.m. Other embodiments may have a different number of time periods than shown and typically a greater number of periods such as sixteen, for example. However, these six time periods are sufficient to illustrate the concepts associated with the priority matrix 260. The value in a cell as identified by a row and column of the priority matrix 260 indicates a relative priority for originating communications for the corresponding contact record. This priority matrix 260 reflects the rank order of the priority for contacting each number in the contact list.

In this embodiment, the contact addresses (e.g., telephone numbers) in column 250 are shown in sorted ascending order. The relative priority for the first time period is shown in the adjacent column. Specifically, the first number in the column, 404-555-1234, is the first record to be dialed in the 10:00 a.m. time period. This is reflected by the value of "1" in cell 202. This value indicates that this record should be dialed first. It is by coincidence in this example that the first number also has the highest priority. The second-highest priority number for this column is the last record corresponding to 404-556-01234, the third number happens to have the third-highest priority; the eighth number is the fourth-highest priority, and so forth.

However, during the second hourly period, which begins at 11:00 a.m., the priority order is different. At this time, the fourth number, 404-555-4567, as reflected in cell 204, is the first record to be dialed. Note that the second prioritized record at the 11:00 a.m. period is the first number 404-555-1234. For each subsequent time period, the best contact record to call at that time (e.g., having a "1" priority) changes, as indicated by cells 206, 208, 210, and 212. The different priorities may reflect different schedules for the contacted parties.

For example, returning to the first number in the list, 404-555-1234, it can be seen that the best time to call the first number is at 10:00 a.m. as shown by cell 202. The second-best time to call this number is at 11:00 a.m. as shown by cell 203. Thereafter, the priority matrix indicates that noon is the next-to-worst time ("9") as shown by cell 205, while there is some improvement reflected later in the afternoon in cells 207, 209, and 211. This priority schedule may reflect the changing schedule of a parent that stays at home with their child in the morning, but then drops off the child at daycare at noon and works at a part-time job in the afternoon. Thus, calling in the morning as opposed to the afternoon is likely to be more successful. The values populating the priority matrix can occur by several ways, as is known to those skilled in the art.

Figure 3:
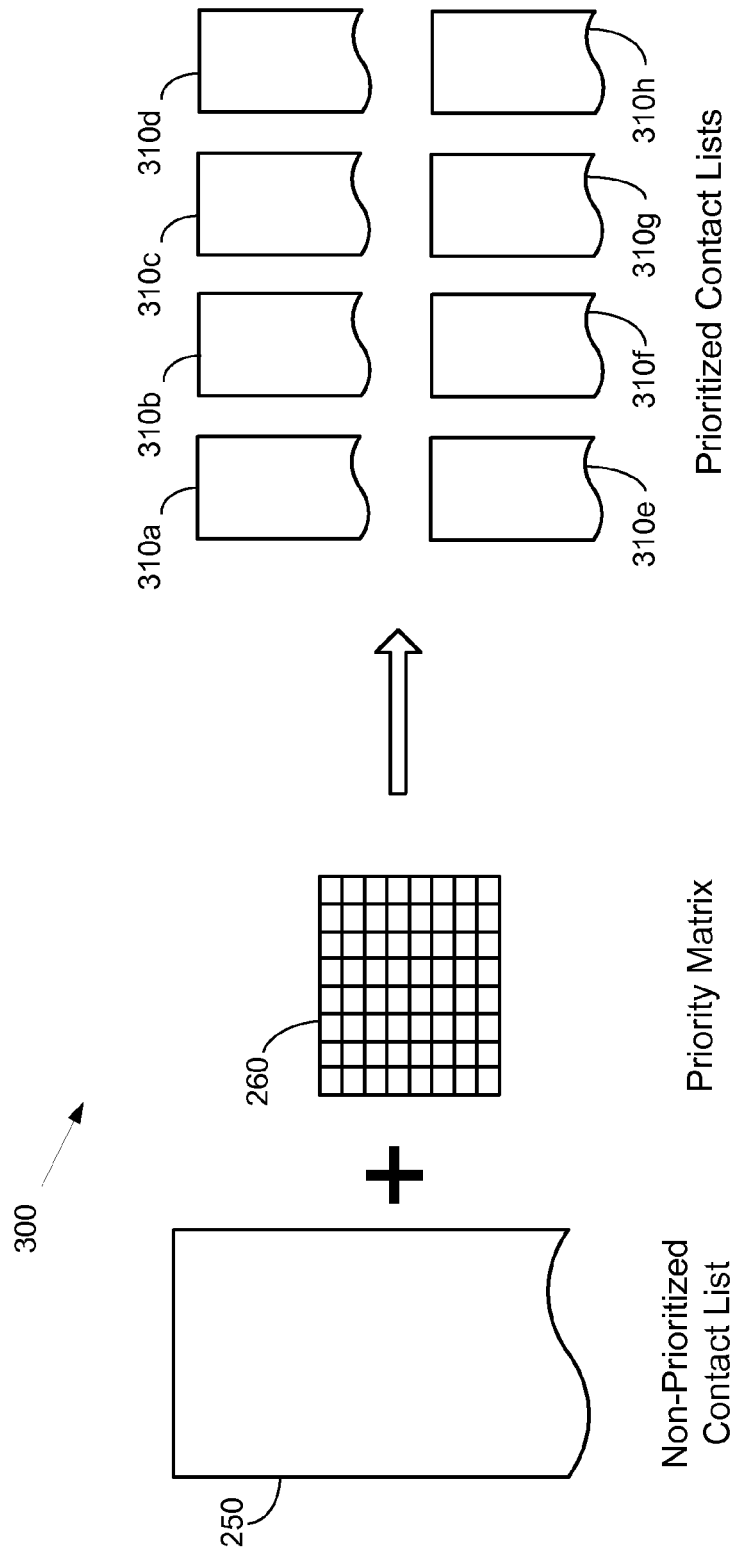
FIG. 3 illustrates using the contact list and the priority matrix to generate a plurality of prioritized contact lists.

Depending on the embodiment, the data structure 200 may not be in a form that can be readily processed by a dialer in a call center. For instance, the dialer may be configured to process contact records in serial order only, and not in priority matrices. Thus, in these particular embodiments, the data structure 200 of FIG. 2 may be converted into a series of prioritized contact lists as shown in FIG. 3. In FIG. 3, the contact list 250, which may not be prioritized for any particular time period, may be a list sorted on the value of the contact address that is associated with the priority matrix 260. The combination of the list 250 and the priority matrix 260 are converted into a series of prioritized contact lists 310*a*-310*h*, each of which comprises an ordered contact list that can be processed by a contact center dialer so that the contact center can schedule the appropriate contact list 310 to use for each appropriate time period. Thus, the ordered contact list 310*a* can be used from 10:00 a.m.-10:59 a.m., and then it can be replaced with the ordered contact list 310*b* to be used from 11:00 a.m.-11:59 a.m., and so forth. Each list is reordered according to the appropriate column in the priority matrix 260 to form the appropriate time period, so that the list order itself indicates the priority of initiating communications to the contacts in the records. This structure allows the dialer to process the list in the order in which the records appear.

One process flow for converting the non-prioritized contact list is to copy the non-prioritized list for a column of time indicated in the priority matrix 260, and then order each corresponding list according to the priority indicated in that column. This generates a single prioritized list for the corresponding time period. The process is repeated for each time period (i.e., column) in the priority matrix 260 until all of the prioritized contact lists 310 have been generated. Each prioritized list is associated with the corresponding time period, and a scheduler in the dialer then uses the appropriate list at the appropriate time.

Agent-Centric List Processing

Agent-centric processing of a contact list focuses on matching one or more records in the contact list with an agent after that agent becomes available, typically based on matching certain characteristics of the agent and the party to be contacted. This is distinct with respect to a list-centric approach for processing a contact list, which involves in part matching an available agent given a completed contact in the list. Typically, in a list-centric approach, there is no consideration of matching an agent and the party based on one or more common characteristics.

The matching of contact records to an available agent in the agent-centric approach may be based on optimized matching. That is, matching of contact records to an available agent in the agent-centric approach may be based ton determine some criteria associated with the agent as maintained in an agent profile and using the criteria to select parties in the contact list having matching characteristics as maintained in a party profile.

Optimized matching may involve determining an affinity based on one or more characteristics of the party and the agent. This may be based on a number of approaches, and typically involves obtaining data from an agent, referred to as agent profile data, that is analyzed to ascertain certain types of characteristics of the agent. This characterization is maintained in an agent profile. The agent data may be obtained at the time the agent is employed, and may involve surveys, questions, psychological profiles, use of third-party demographic databases, etc. Similarly, contact party data, referred to as party profile data, may be obtained from various sources, analyzed, and the characterization stored in a party profile. Various techniques may be used to determine an optimal match of an agent's profile with a party's profile. Such techniques may involve those disclosed, for example, in U.S. Patent Publication 2009/0190747, entitled "Call Routing Methods and Systems Based On Multiple Variable Standardized Scoring" or in U.S. Pat. No. 6,798,876, entitled "Method and Apparatus for Intelligent Routing of Incoming Calls to Representatives in a Call Center," the contents of which are incorporated by reference. This may involve matching a demographic, socio-economic, personality style, or other characteristic as determined by various techniques known to those skilled in the art.

For example, in one relatively simple example, the same characteristic of the agent and the contacted party could be determined and matched. The agent's age can be easily determined, and in many instances, so can the contacted party's age be determined, or at least estimated. Thus, for contacted parties in the 20-29 age group, an agent in the same age group could be matched to handle the call. This could be considered an "optimal" match. If an agent in this age group is not available, then an agent in the 30-39 agent group could be selected. This could be considered a "second best" match, and so forth.

In other embodiments, the determination of a best match may involve different characteristics. For example, agents may be identified with a region of the country or classified with respect to a linguistic accent. Thus, agents classified as from the south of the U.S., or classified as speaking with a southern accent, may be matched with contacted parties having a geographic location in rural parts of southern states. Agents lacking an accent may be matched with contacts in metropolitan areas or higher income levels, regardless of region. In this case, matching a linguistic characteristic with a location may be closely related, but different characteristics. In such situations, a prior determination may be made to define which characteristics in the agent profile and which characteristics in the contacted party's profile are deemed optimal or second best when the characteristics are not the same metric. In particular, it may require significant expertise to determine how to optimally match known agent characteristics with the known contacted party's characteristics when they are different. For example, given a zip code and associated demographics of a contacted party, ascertaining the best agent age group to utilize may require significant research. However, once determined, the best matching can be easily reflected in a look-up table that can be easily used.

The characteristic in the agent profile is a personal attribute associated with the agent that is not a skill-related capability of the agent, nor a language spoken by the agent. The characteristic may be, e.g., a personality style characteristic, a social-economic indicator, a demographic indicator, age, sex, or other personal attribute of the agent. Demographic indicators include socioeconomic standing, age, area of residence, education level, income level, or other factors generally recognized as a demographic indicator. Similarly, the contact party characteristics may be based on similar characteristics, but may include data from their purchasing habits, customer history, third party information sources, etc.

Figure 4:
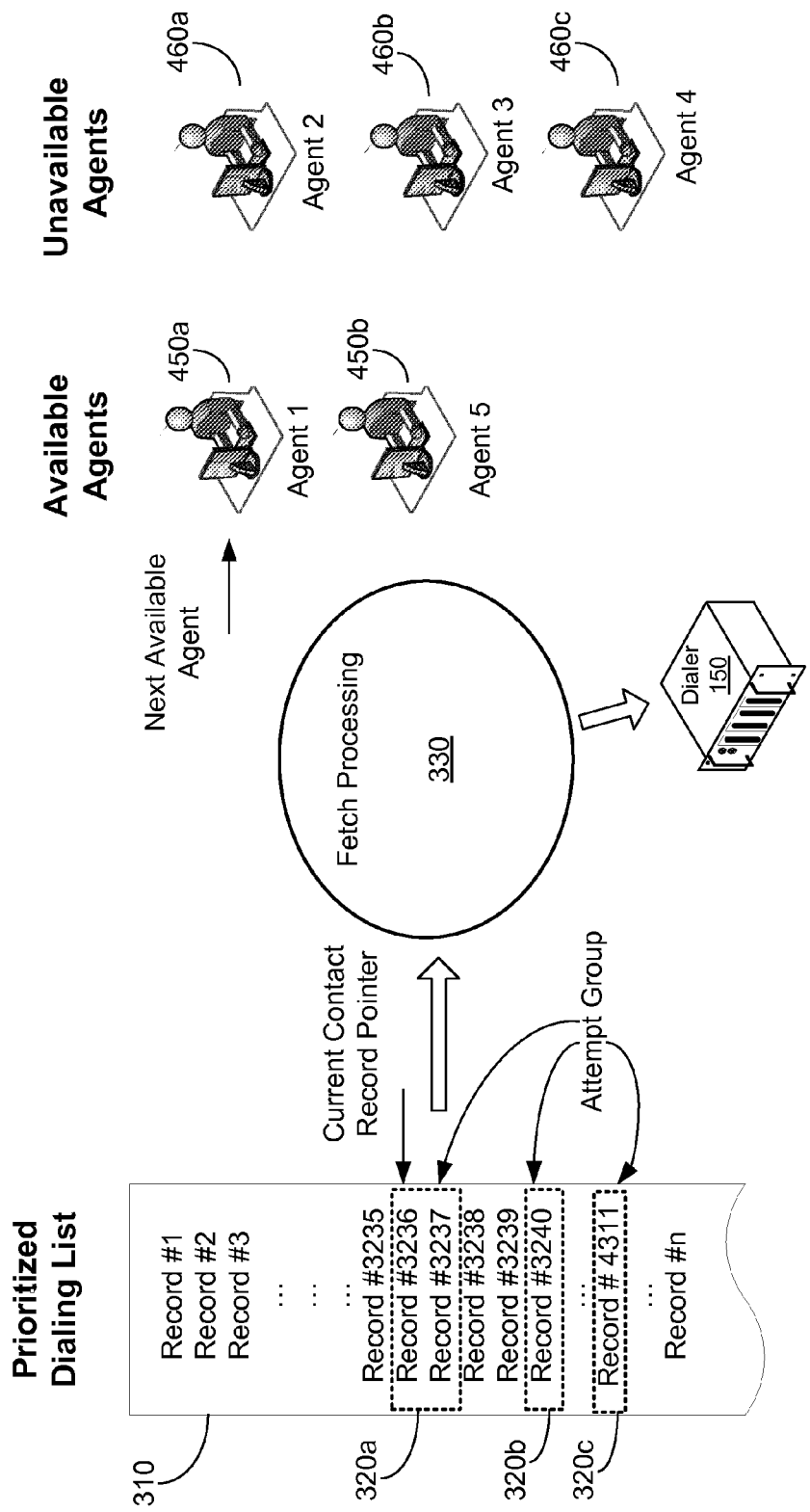
FIG. 4 illustrates the concepts of selecting the best matched compatible contact records in the prioritized contact list for an available agent.

FIG. 4 illustrates various aspects of one embodiment of agent-centric list processing. In this embodiment, the call center may have a series of agents available during a shift (specifically, a total of five agents). These agents are shown in FIG. 4 as divided into groups of available agents 450a-450b and unavailable agents 460a-460c. The unavailable agents may be unavailable because they are, e.g., on a break, involved in after-call wrap-up related activities, training, or communicating with a caller. At this moment in the illustration, two agents 450a-450b are indicated as available. In some embodiments, a pointer may identify the next available agent that is to be selected. This may ensure that available agents are selected in an equitable manner for handling contacts of an outbound communication. Otherwise, typically the first agent placed into the available queue would be the first agent selected, which could result in the last available agent experiencing long delays.

The embodiment in FIG. 4 illustrates the concepts based on using a dialer 150 originating telephone calls for the outbound contacts. It should be recognized that other forms of outbound communication could be used to illustrate the principles and technologies herein. The dialer 150 executes a process, called fetch processing 330, which obtains or fetches the records in the contact list that are be dialed. In the agent-centric processing approach, the dialer knows that Agent 1 450a is the next available agent, and also knows the agent profile of Agent 1. The fetch processing 330 then proceeds to search the prioritized dialing list 310 for a set of contact records, wherein the contact party's profile is best suited for that agent's profile. The set of records that has a matching profile is termed the "attempt group."

Typically, more than one best-matched dialing list records are returned from the search in the list 310 and used to form the attempt group, since usually a number of outbound calls must be made before a right party connect ("RPC") is encountered. In many instances, for a particular call, an intercept announcement or answering machine may answer the call, so that although the call may have been answered, the 'right party' has not been connected. The outbound dialer may screen out such calls before connecting the call with the agent. By dialing a number of simultaneous calls, the agent's waiting time to handle a RPC is reduced.

Based on various conditions, the number of records in the attempt group may vary. In FIG. 4, the attempt group comprises four records, as indicated by dotted-line groupings 320a, 320b, and 320c. These four records are associated with a contact party profile that is most optimized for, or best-matched with, the profile of Agent 1. The dialer 150 then originates calls to these telephone numbers, and connects the first call encountering a RPC to Agent 1. After the first call is connected, the other calls in the attempt group may receive different treatment, as will be seen. Specifically, the other calls may be, e.g., terminated or connected with another matching agent.

Once Agent 1 is occupied with a call, Agent 1 may be considered as unavailable by the dialer, removed from the queue of available agents, and added to the unavailable agent queue. That leaves Agent 5 450b as the next available agent. The fetch processing 330 ascertains the profile of Agent 5 and then searches and retrieves the prioritized dialing records best matching the agent profile of Agent 5 so as to form another attempt group, and so the process repeats.

Typically, the identification of the party records forming the attempt group begins by searching from the top of the contact list 310 downward to identify compatible records that have not resulted in a RPC. In this manner, the higher priority records are returned first. Records that have previously resulted in a RPC are marked as such and are skipped over. Typically, a record resulting in a RPC is not selected again to avoid redialing. However, records that have been used in originating an outbound call, but which did not result in a connection, may be selected again.

Each contact address, or specifically the telephone number as shown in the embodiment in FIG. 4, in a contact record can be associated with a status indicator or state value. (Alternatively, the contact record itself can be described as having the status indicator.) In the initial state, each contact address is in "available" for selection state. This indicates that the address may be evaluated for inclusion in an attempt group. If the address is selected for an attempt group, then that address's state is in a "selected" state, reflecting that it is selected and being used to dial a party for potential matching with an agent. If there is no connection or RPC, then the address can be returned to "available" for selection state. However, if the contact address results in a RPC, then the contact record is tagged as being "completed" and will be unavailable for additional consideration in outbound dialing attempts.

Figure 5A:
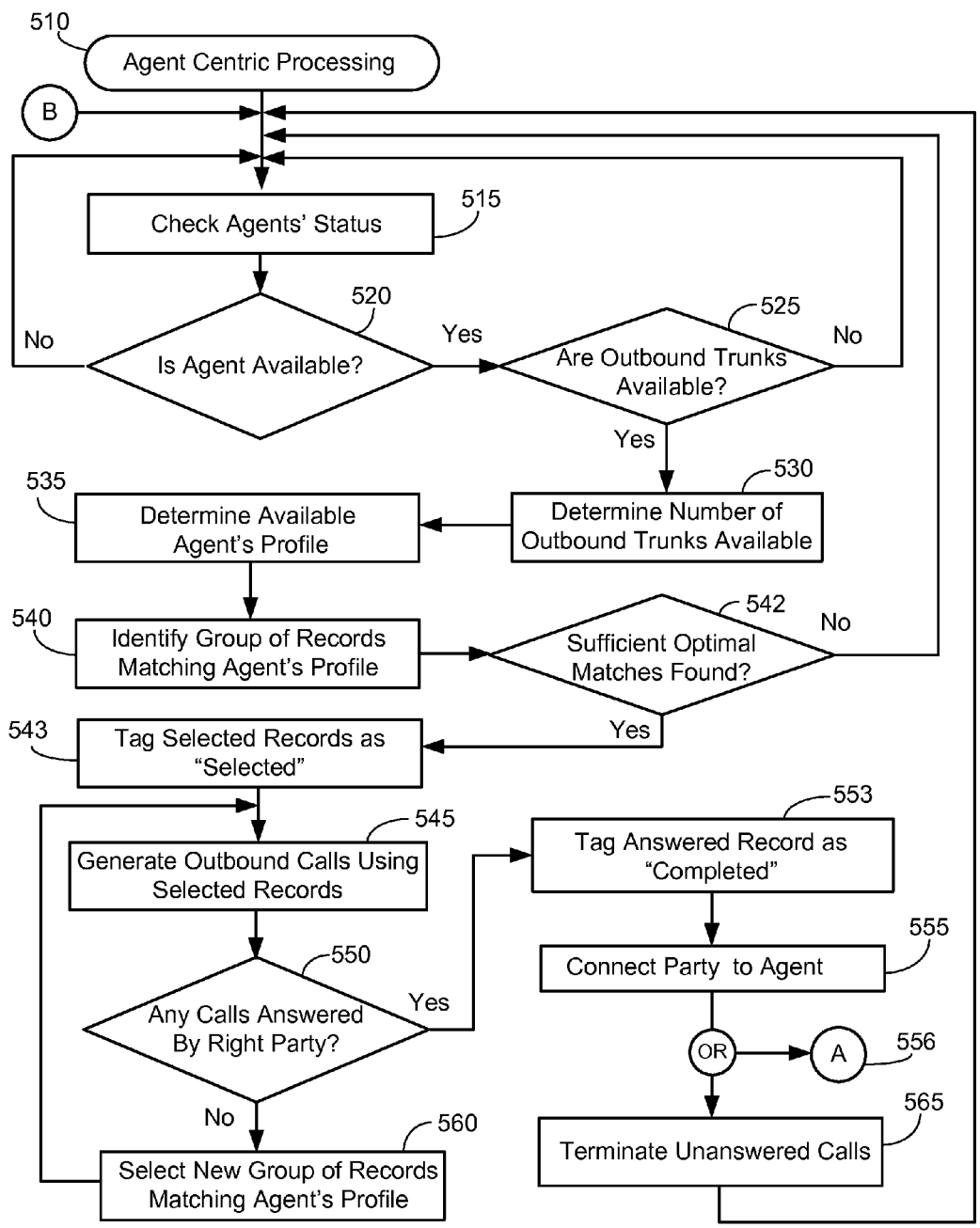
FIGS. 5A-5B are an exemplary illustration of one embodiment of a process flow associated with agent-centric list processing.
Figure 5B:
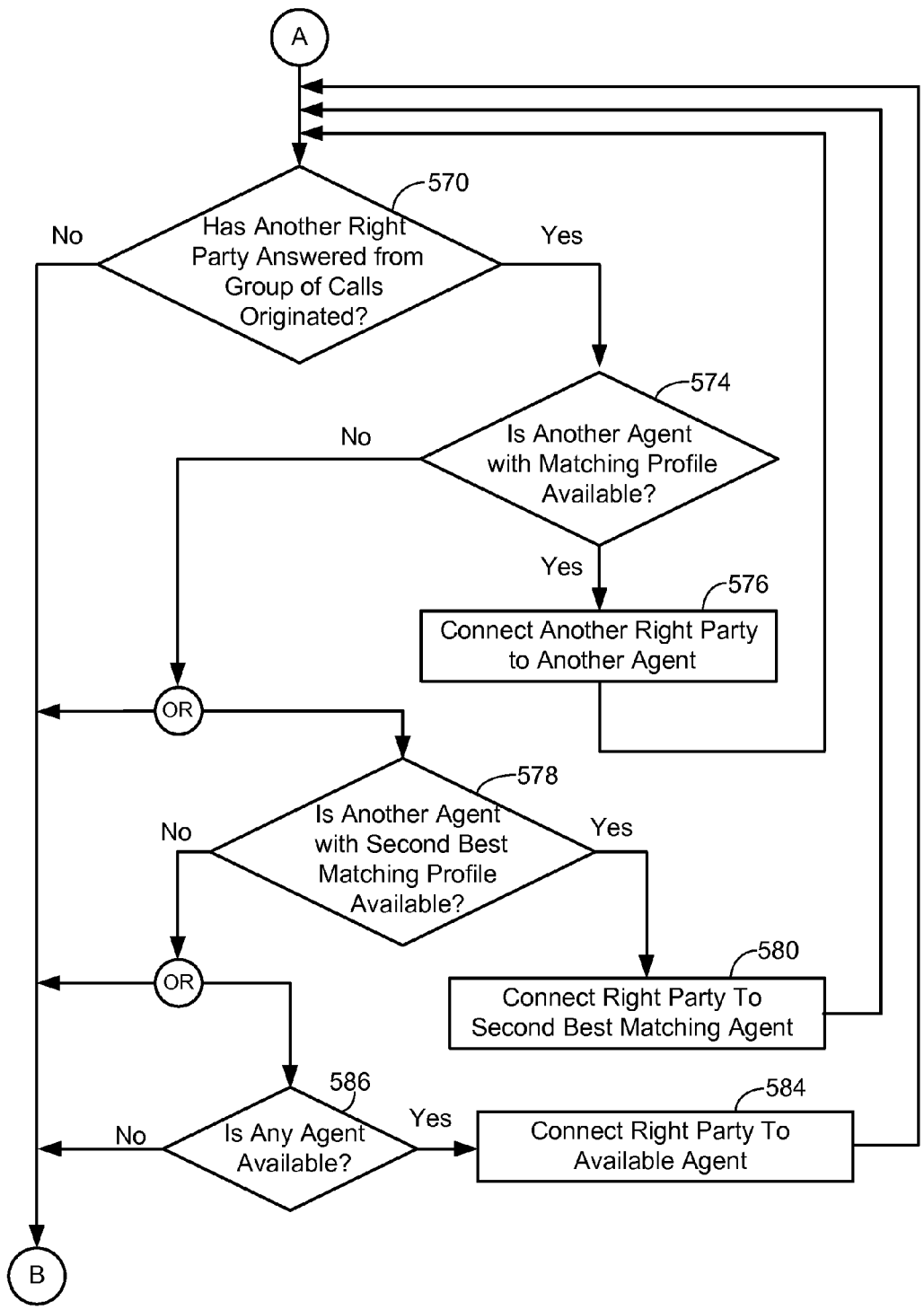

One embodiment of the agent-centric process 510 is shown in FIGS. 5A-5B. The logical operations described herein are implemented as a sequence of computer implemented acts or one or more program modules running on a computing system and/or as interconnected machine logic circuits or circuit modules within the computing system. The implementation is a matter of choice dependent on the performance and other requirements of the computing system. Accordingly, the logical operations described herein are referred to variously as states, operations, acts, or modules. These operations, acts, and modules may be implemented in software, in firmware, in special purpose digital logic, and any combination thereof. Greater or fewer operations may be performed than shown in the figures and described herein. These operations may also be performed in certain cases in a different order than those described herein.

In FIG. 5A, the process begins with checking the agents' status in operation 515. If an agent is not available in operation 520, then the process loops back to operation 515 and waits for an agent to become available. If an agent is available, then in operation 525 a determination is made in operation 530 whether any outbound trunks (or equivalent resources in a VoIP or other environment) are available. If no resources are available for originating calls, then the process loops back to checking the agents' status.

If there are trunks available to establish outbound calls, then the available agent's profile is ascertained in operation 535. This may be accomplished by a table look-up using the agent's identifier, or other well known data structures. Once the agent's profile is known, then in operation 540 a corresponding number of contact records having a matching profile in the contact list are identified. If, in operation 542, there is an insufficient number of optimally matched records found, then the process may loop back. If there are a sufficient number of matches found, then the selected records in operation 543 forming the attempt group are tagged or otherwise indicated as being in the "selected" state. Records tagged as "selected" prevents these records from being selected for another attempt group when processing the next available agent.

In operation 545, the outbound calls are generated using the selected call records in the attempt group. In particular embodiments, the size of the attempt group is not greater than the number of available trunk resources. This ensures that every selected record comprising the attempt group has an outbound call originated using the contact address.

In operation 550, a determination is made whether any of the calls in the attempt group are answered by a right party, i.e., they encounter a RPC. It may be presumed that intercept announcements, answering machines, and busy signals are screened appropriately. If no answer for any of the calls occurs after a suitable time, then the calls are terminated and in operation 560 another group of records are selected that match the agent's profile and the process loops back. Although not shown in the process flow, the call records are tagged appropriately as being "available" for selection and "selected." Specifically, call records that do not result in a RPC are re-tagged as "available."

If a call is answered by the right party in operation 550, then in operation 553 the appropriate call record is tagged as "completed" (e.g., a RPC has been encountered) and the answered call is connected to the agent in operation 555. Thus, in this manner, the available agent is connected to a caller that has a matching profile for achieving an optimally successful outcome.

At this point, there may be other calls which are pending in the attempt group. In one embodiment, all the unanswered calls are terminated in operation 565 and the records are re-tagged as being "available." The process then loops and checks other agents' status.

In another embodiment, the unanswered calls in the attempt group may be processed as indicated by the connector 556 in FIG. 5A ("A" connector) as detailed in FIG. 5B. The unanswered calls in the attempt group all have a certain contact party profile, and these calls remain in the offered state in case another RPC occurs in operation 570. If not, then these calls may be terminated and the process loops back to operation 515 of FIG. 5A. Otherwise, if a RPC is encountered for another call in the attempt group, then in operation 574 a determination is made whether another agent having the same profile is available. If so, then in operation 576, that call may be connected to that other agent. The process may then loop back to check if another caller in the attempt group answers. After a timer expires, it can be assumed that no further pending calls in the attempt group will encounter a RPC and the calls can be terminated.

The above scenario can be summarized as a number of calls in an attempt group are originated for an agent having a particular agent profile. The first RPC encountered will be connected to that agent. The remaining calls can be terminated or if another RPC occurs, another agent having the same agent profile may be identified (if available) and connected. And so forth. It is possible, however, that in operation 574 when another RPC occurs that no agent is available having the same optimal matching profile. If so, then the process may optionally proceed to operation 578, where a determination is made whether there is an available agent having a "second-best" matching profile. A "second-best" matching profile may not be optimal, but may be acceptable under the current circumstances, and preferable to hanging up on the answered call. In this case, the flow proceeds from operation 578 to operation 580 where the RPC is connected to the second-best matching available agent. The process may loop back to operation 570.

Alternatively, if in operation 578 there is not a second-best matching agent available, the process may proceed to operation 586 where a determination is made whether any agent is available. If so, then the RPC may be matched to the available agent in operation 584.

The process in FIG. 5B discloses one embodiment for processing calls in an attempt group after the initial call has been matched with the available agent. Some embodiments may choose to terminate all the unanswered calls immediately after the initial RPC is matched with the agent, whereas other embodiments may choose to keep the unanswered calls pending, and possibly connect them to another best matched agent, a second-best matched agent, or any available agent. The best matching can also be described as an "optimal" matching, and a second-best matching or nth level matching can be described a "sub-optimal" matching. As the matching level goes from best matched, second-best matched, and possibly third or fourth-best matched, all the way to any available agent, the matching process gradually "weakens" to the point where matching the call with "any" available agent begins to forgo the advantages of matching an agent with a caller, and rather mimics the conventional list-centric processing of outbound calls. When there are no preferences in regard to pairing a contact with an agent, then no matching of any level occurs. "Matching" implies a preference of some sort for selecting one over the other.

Figure 6:
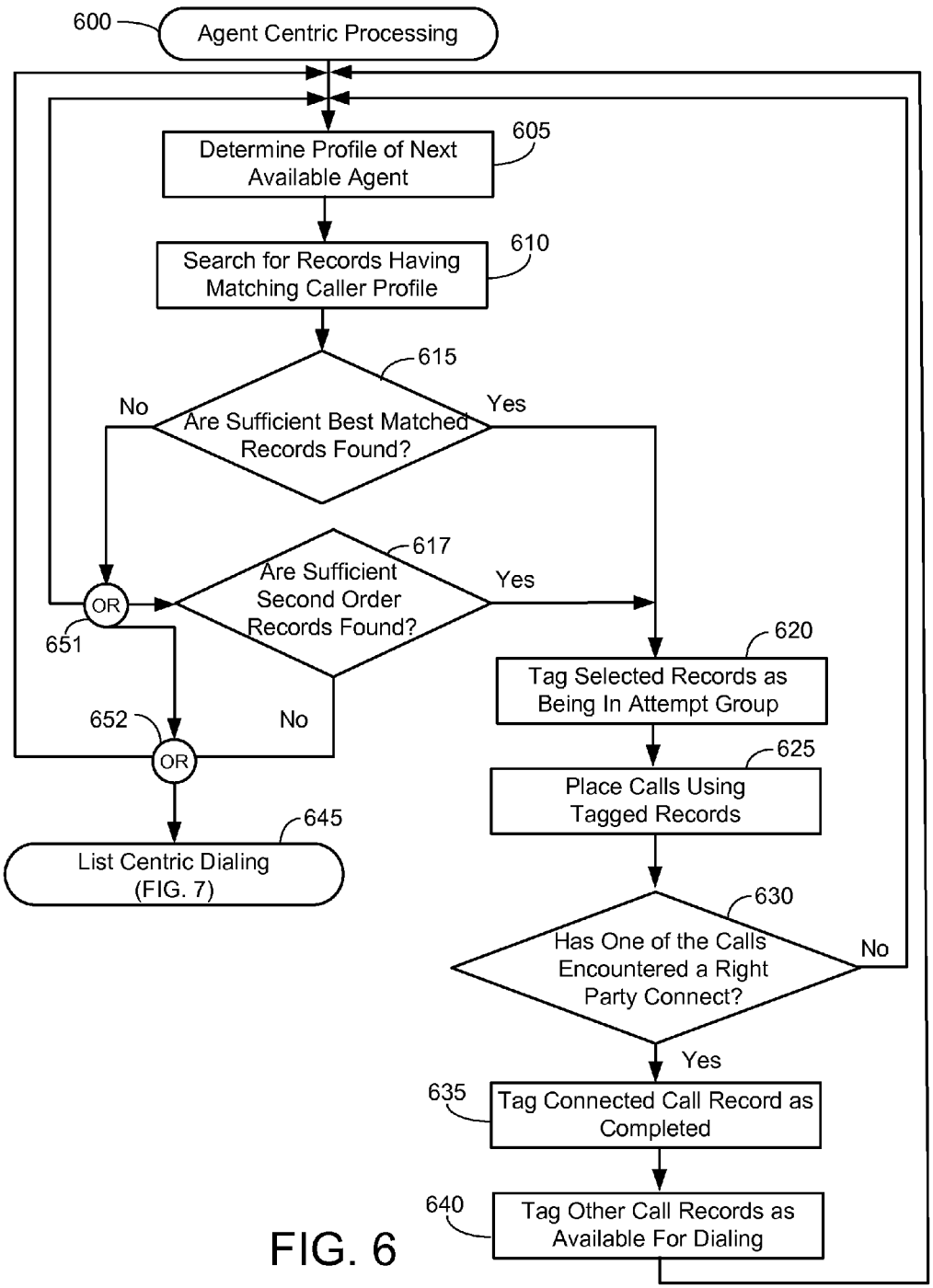
FIG. 6 is another exemplary illustration of a process flow associated with agent-centric list processing.

Another embodiment reflecting a change in processing from agent-centric processing to list-centric processing is shown in FIG. 6. The process 600 begins with operation 605 by determining the profile of the next available agent. Then, in operation 610 a search is performed for optimally matched records in the contact list. As characteristic of an agent-center process, the available agent's profile may be used to determine and select the records in the attempt group to dial.

In operation 615, a check is made to determine whether there are sufficient "best matched" records available in the list. In many cases there will be some best matched records such that the process flow proceeds to operation 620, where these records are tagged as selected, and calls are placed using the selected records in operation 625. Further, if a RPC is encountered in operation 630, the call is connected to the agent and tagged as completed in operation 635. The other calls can be released and the corresponding records can be tagged as available in operation 640. The process then loops back to process the next available agent. Operations 620-640 refer to creating an attempt group, originating calls, connecting a RPC, and handling the other calls appropriately.

Of further interest in FIG. 6, however, is the processing performed when it is determined in operation 615 that there are an insufficient number of best matching records. In this case, a decision at operation 651 is made as to whether to proceed with a second-best match in operation 617, or to proceed to operation 652. At operation 652 another decision is made whether to skip originating calls for this agent by looping back to operation 605, or to proceed to the list-centric dialing in operation 645 (FIG. 7) where any records may be used. In other words, if insufficient records are located for an available agent, then the processing may:

1) maintain the best-record matching process, but since there are no records that match this agent, skip to the next available agent;
2) migrate to a second-best agent matching process; or
3) migrate to a list-centric process (which matches to any available agent).

Other combinations are possible, such as including a third-best matching process, fourth-best matching process, etc.

The criteria used in operations 651 and 652 to determine when to migrate or retain the currently used list processing approach may vary depending on circumstances. For example, assume that the contact list is optimized based on hourly time periods. That is, each hour the call center loads a new prioritized contact list to process. At the beginning of the hour, it can be expected that for any available agent there will likely be a number of best match contact records available that can be selected from the list to form the attempt group. As processing of the list progresses, it is possible that on a second or subsequent pass through the list that a particular available agent may have an insufficient number of best matching contacts available in the list to form a complete attempt group, or even a partial attempt group. In this case, it would be appropriate to switch to a second-best matching process or even a list-centric process. Otherwise, that agent may not have any calls originated on their behalf, and they would be idle for the remainder of the time period, until a new list was loaded. In embodiments where the contact list is lengthy relative to the number of agents, it may be rare that a second pass occurs during the defined time period. Thus, each time period the highest priority contacts are processed, and there may be a sufficient number of best matching or second-best matching contacts available.

The migration from a best-match to second-best match, and then to matching any agent, may be done automatically. Specifically, whenever there is a deficiency of best-match contact records occurs, then second-best matching records are included into the contact group. In other embodiments, the migration may be conducted on an agent-by-agent basis, or on a campaign-by-campaign basis. The call center supervisor may set the processing so that it is exclusively best-match, or defaults to second-best or list-centric matching to ensure that agents are not idle.

Recall that when a list is initially processed, processing begins from the beginning of the list, and it can be expected that the best matching processing mode will locate contact records compatible with the agent's profile. Thus, it is unlikely that a sufficient number of best matches would not be located for an agent when beginning a new list. Since a number of prioritized lists are defined (e.g., one for each hour), each time a new time period starts, a new prioritized list will be started. Thus, by combining the use of prioritized lists along with an agent-centric approach for processing the prioritized lists, an effective approach for using the agent-centric approach is provided. Specifically, this ensures that at the beginning of each hour, the agents are optimally matched with contacts. Without such a prioritized list, it may be more likely that certain agents would not have enough best matching records to form an attempt group, and agent efficiency would decrease.

List-Centric Processing

If a best match for an available agent is not possible, nor if a second-best match is possible (nor a third-best, or an nth-best), it may be appropriate to migrate to a list-centric processing mode. In this mode, no preference is attached to matching an agent to a certain type of party. The agent can be matched to any party, and equivalently, any party can be matched to any agent. In this case, the process can be described as matching an existing call to any available agent or vice versa.

Figure 7:
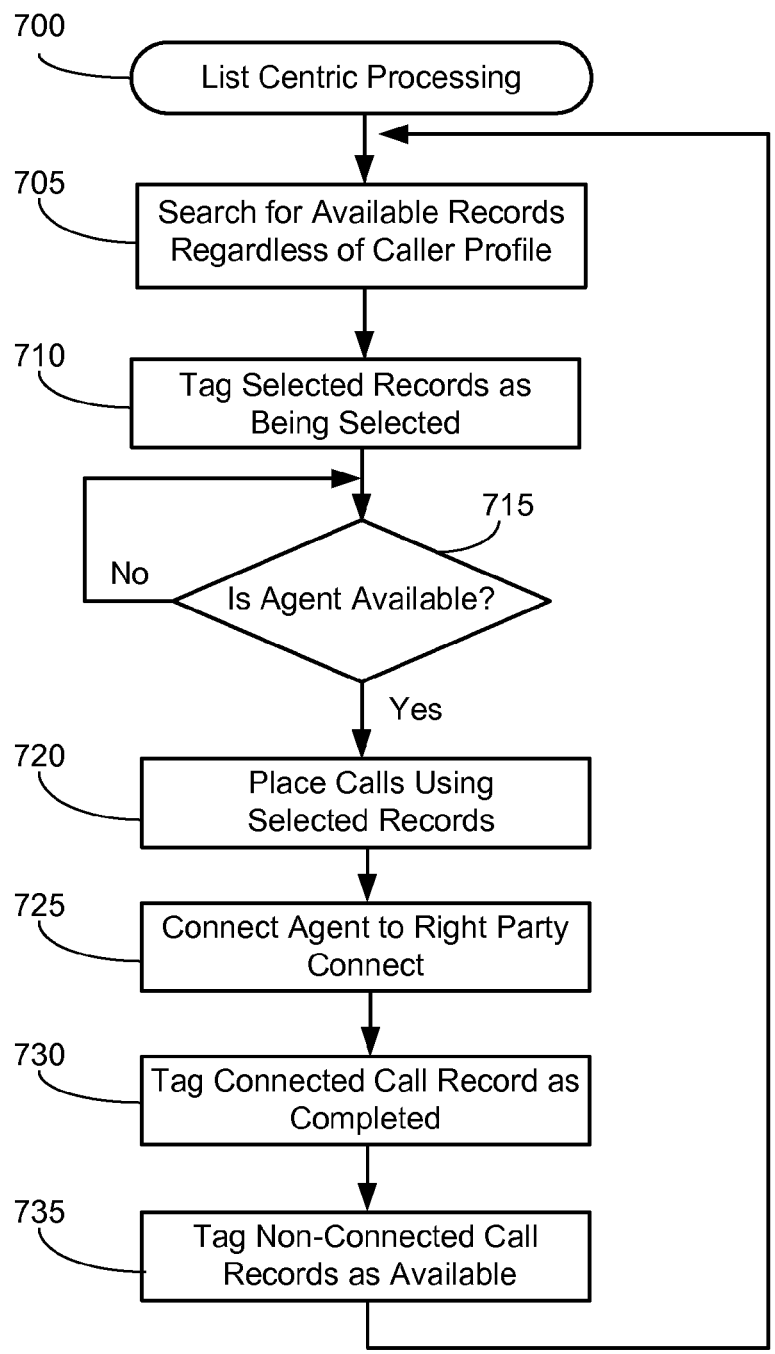
FIG. 7 is an exemplary process flow for list-centric processing.

This process 700 is shown in FIG. 7, where the process 700 searches in operation 705 for any available records (e.g., those tagged as "available") in the contact list. This search may be made in a top-down manner, without regard to the party's profile. Once, in operation 710, a sufficient number of records have been identified to form an attempt group, a determination is made if any agent is available in operation 715. If not, the process waits. When any agent is available, then in operation 720, calls are originated using the selected records in the attempt group. In operation 725, the agent is connected to the first RPC and in operation 730, the corresponding contact record is tagged as "completed." The other calls can be terminated and their contact records can be indicated as "available" in operation 735. The process then loops back to operation 705.

Although this is one form of list-centric processing, other variations are possible. However, in list-centric processing, there is no attempt to match a party's profile with the agent's profile.

Application to Virtual Call Centers

The above concepts and technologies can be applied to virtual call centers, e.g., wherein the agents may be remotely located from each other and from the ACD. Returning to FIG. 1 briefly, each of the agent positions can be accessed via networking technologies. The agent workstation may be, e.g., a SIP compatible device. In such environments, it may be easier to schedule a large number of agents for certain hours, when peak calling times are encountered. In such arrangements, the dialer 150 may recognize that a large number of agents are available, and process outbound contacts in an agent-centric mode, particularly at the beginning of a time period when a new prioritized list is scheduled. At other times, the dialer may revert back to a more list-centric approach, or could simply originate calls first and then connect them to any available agent. This change in processing could be dictated by the number of scheduled agents, size of the contact list, campaign requirements, etc.

Exemplary Computer Processing Device

Figure 8:
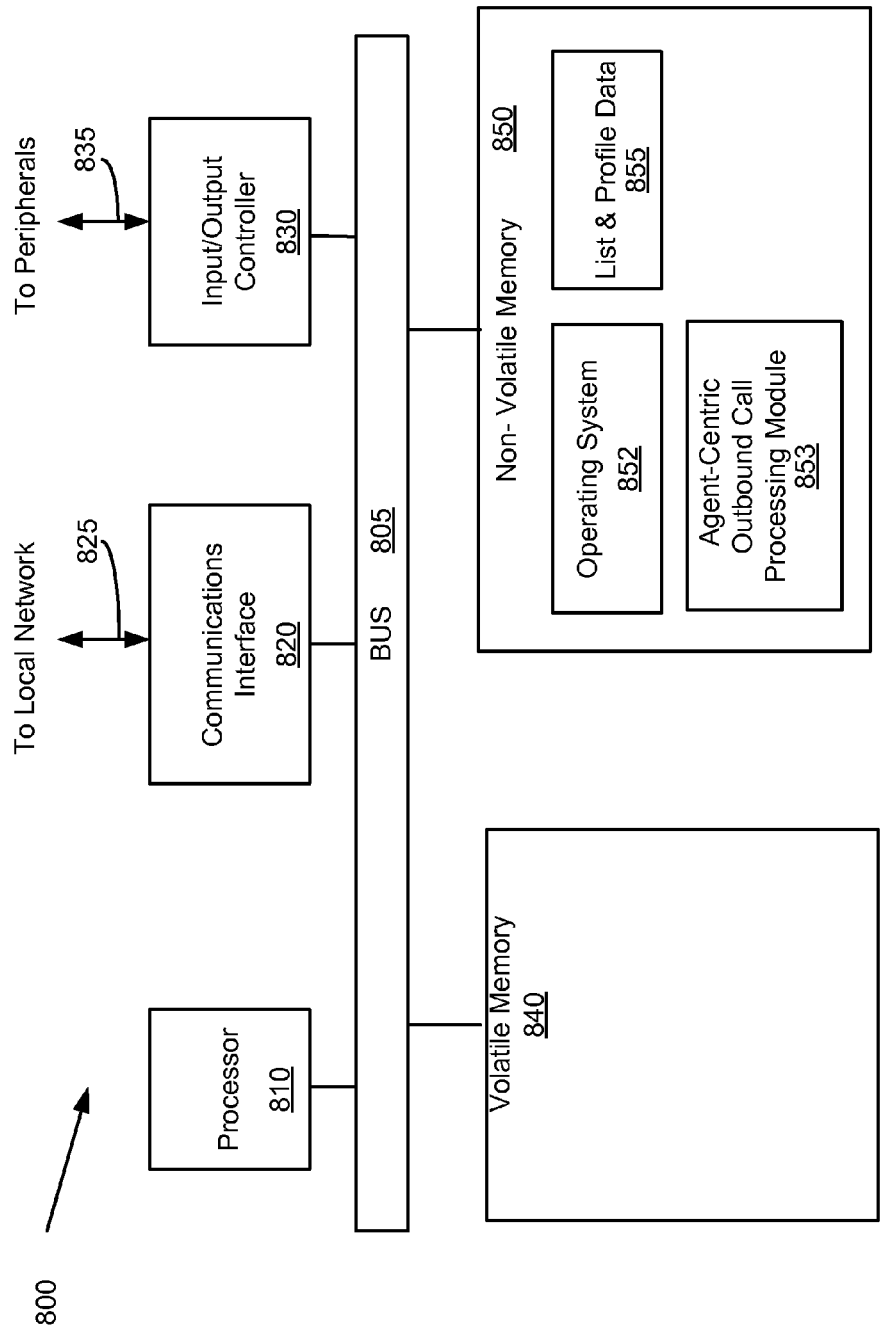
FIG. 8 is a schematic diagram of a processing device used in an outbound contact list processing system used to practice the concepts and technologies disclosed herein.

As discussed in conjunction with FIG. 1, the call center architecture 100 may comprise various components, including a dialer 150 that performs the list processing, and that comprises a computer processing system. FIG. 8 is an exemplary schematic diagram of a computer processing system that may be used in an embodiment of the call center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 8, the processing system 800 may include one or more processors 810 that may communicate with other elements within the processing system 800 via a bus 805. The processor 810 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 800 may also include one or more communications interfaces 820 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 830 may also communicate with one or more input devices or peripherals using an interface 835, such as, but not limited to: a keyboard, a mouse, a touch screen/display input, microphone, pointing device, etc.

The input/output controller 830 may also communicate with output devices or peripherals, such as displays, printers, speakers, headsets, banner displays, etc. These may be used, in part, to receive Administrator input, including for interacting with the manual agent selection module.

The processor 810 may be configured to execute instructions stored in volatile memory 840, non-volatile memory 850, or other forms of computer readable storage media accessible to the processor 810. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 850 may store program code and data, which also may be loaded into the volatile memory 840 at execution time. Specifically, the non-volatile memory 850 may store one or more agent-centric outbound call processing modules 853 that may perform the above mentioned process flows and/or operating system code 852 containing instructions for performing the process and/or functions associated with the technologies disclosed herein. The agent-centric outbound call processing modules 853 may also access, generate, or store list and profile related data 855, including the data described above in conjunction with the prioritized contact lists and agent profiles and contact profiles, in the non-volatile memory 850, as well as in the volatile memory 840. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 810. These may form a part of, or may interact with, the agent-centric outbound call processing modules 853.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. An agent-centric method for associating an outbound communication with an agent in an outbound contact center comprising:
   receiving a list of outbound contact records, wherein each contact record indicates a respective contact telephone number and is further associated with a respective contact party profile, and wherein at least one of the contact records is associated with the respective contact party profile comprising at least one first characteristic comprising a demographic indicator;
   determining an available agent from among a plurality of available agents in the contact center, wherein the available agent is associated with an agent profile comprising at least one second characteristic previously matched with the demographic indicator;
   selecting a plurality of outbound contact records from the list of outbound contact records to form an attempt group, wherein the selection of the plurality of outbound contact records is based on each contact party profile comprising the demographic indicator previously matched with the at least one second characteristic of the agent profile;
   originating outbound communications for the available agent by the outbound contact center, wherein the outbound communications are generated by a dialer using the plurality of outbound contact records in the attempt group;
   determining a right party connect is established that is associated with one of the outbound communications generated using the plurality of outbound contact records in the attempt group; and
   connecting the one of the outbound communications to the available agent.

2. The method of claim 1 further comprising the following operations occurring after the one of the outbound communications is connected to the available agent:
   determining a second right party connect is established that is associated with another one of the originating outbound communications generated using the plurality of outbound contact records in the attempt group;
   selecting a second available agent from a remaining plurality of available agents, wherein a second agent profile is associated with the second available agent that is matched with the demographic indicator; and
   connecting the another one of the originating outbound communications with the second available agent.

3. The method of claim 1 further comprising:
   terminating all remaining originating outbound communications generated using the plurality of outbound contact records in the attempt group after the one of the outbound communications is connected to the available agent.

4. The method of claim 1 further comprising operations performed after the one of the outbound communications is connected to the available agent:
  determining an additional right party connect is established that is associated with another one of the originating outbound communications generated using the plurality of outbound contact records from the attempt group;
  determining that no further agents are available having an associated agent profile matching with the at least one first demographic indicator;
  determining another agent is available from among the group of available agents associated wherein the another agent is associated with another agent profile that is sub-optimally matched with the at least one first demographic indicator; and
  connecting the another one of the originating outbound communications with the another agent.

5. The method of claim 1 further comprising:
  determining an additional right party connect is established that is associated with another one of the originating outbound communications generated using the plurality of outbound contact records from the attempt group;
  determining that no further agents are available having an associated agent profile matching with the at least one first demographic indicator;
  in response to determining that no further agents are available having the agent profile matching with the demographic indicator, determining whether yet another agent with yet another agent profile that does not comprise the second characteristic sub-optimally matches the at least one first demographic indicator; and
  connecting the yet another agent with the another originating outbound communication.

6. The method of claim 1, wherein receiving the list of outbound contact records comprises:
  receiving an initial list of outbound contact records and a priority origination matrix;
  generating a plurality of ordered outbound contact record lists for a corresponding plurality of contiguous time periods using the initial list of outbound contact records and the priority origination matrix, wherein each of the plurality of ordered outbound contact record lists comprises an ordered sequence of outbound contact records based on the initial list of outbound contact records;
  scheduling one of the plurality of ordered outbound contact record lists for a time period;
  selecting the ordered sequence of outbound contact records from the one of the plurality of ordered outbound contact record lists for a corresponding time period as the list of outbound contact records; and
  originating the outbound communications using the one of the plurality of outbound contact record lists during the time period.

7. The method of claim 1 further using a list-centric approach for matching an outbound contact with an agent, the list-centric approach comprising:
  determining a second available agent from the plurality of available agents;
  selecting a second plurality of outbound contact records from the list of outbound contact records regardless of contact party profile to form a second attempt group;
  originating second outbound communications for the second available agent using the second plurality of outbound contact records in the second attempt group;
  receiving a second right party connected associated with one of the second outbound communications of the second attempt group; and
  connecting the one of the second outbound communications with the second available agent.

8. The method of claim 7 wherein the list-centric approach occurs when an insufficient number of outbound contact records are selected for the plurality of outbound contact records to form the attempt group of a certain number.

9. A method for generating an outbound communication for association with an available agent in a contact center, the method comprising:
  receiving a list of outbound contact records and a priority origination matrix at a dialer in the contact center, wherein the priority origination matrix indicates a prioritized order of the outbound contact records for a plurality of contiguous time periods;
  generating a plurality of ordered outbound contact record lists comprising a corresponding plurality of data structures recognizable by the dialer for the corresponding plurality of contiguous time periods using the list of outbound contact records and the priority origination matrix, wherein each of the ordered outbound contact record lists comprises an ordered sequence of outbound contacts records from the list of outbound contact records;
  scheduling one of the plurality of ordered outbound contact record lists for a time period; and
  originating the outbound communications using the one of the plurality of ordered outbound contact record lists during the time period.

10. The method of claim 9 wherein the outbound communications are associated with an attempt group comprising outbound contact records, wherein the number of outbound contact records in the attempt group is less than or equal to available resources required to make a number of calls by the dialer, wherein each outbound contact record is associated with a contact party profile with a first characteristic, and further comprising:
  determining an available agent from among a plurality of available agents in the contact center, wherein the available agent has an agent profile comprising a second characteristic optimally matching the first characteristic;
  selecting a plurality of outbound contact records from the list of outbound contact records to form the attempt group, wherein the selection is based on each contact party profile of the respective selected plurality of outbound contact records comprising the first characteristic optimally matching the second attribute of the agent profile;
  determining a connection established by of one of the outbound communications; and
  connecting the one of the outbound communications to the available agent.

11. A non-transitory computer readable tangible medium comprising instructions that when executed by a processor cause the processor to:
  receive a list of outbound contact records, wherein each outbound contact record indicates a respective contact telephone number and is further associated with a respective contact party profile, wherein at least one of the outbound contact records is associated with the contact party profile comprising at least one first demographic indicator;

determine an available agent from among a plurality of available agents in a contact center, wherein the available agent is not presently engaged in an outbound communication;

determine an agent profile associated with the available agent, wherein the agent profile comprises a characteristic previously matched with the at least one first demographic indicator;

select a plurality of outbound contact records from the list to form an attempt group, wherein the selection of the plurality of outbound contact records is based on each contact party profile of the respective selected plurality of outbound contact records comprising the at least one first demographic indicator matching the characteristic of the agent profile;

originate outbound communications for the available agent, wherein the outbound communications are generated based on the plurality of outbound contact records in the attempt group;

determine a right party connect is established that is associated the outbound communication, wherein the outbound communication is one of the outbound communications generated based on the plurality of outbound contact records in the attempt group; and connect the outbound communication to the available agent.

12. The non-transitory computer readable medium of claim 11, wherein the instructions further cause the processor to:

determine a second right party connect is established that is associated with another one of the originating outbound communications generated based on the plurality of outbound contact records in the attempt group;

select a second available agent from a remaining set of the plurality of available agents, wherein a second agent profile associated with the second available agent comprises the characteristic optimally matching the at least one first demographic indicator; and connect the another one of the originating outbound communications with the second available agent.

13. The non-transitory computer readable medium of claim 11, wherein the instructions further cause the processor to:

terminate all remaining originating outbound communications generated based on the plurality of outbound contact records in the attempt group after connecting the one of the outbound communications to the available agent.

14. The non-transitory computer readable medium of claim 11, wherein the instructions further cause the processor to:

determine an additional right party connect is established that is associated with another one of the originating outbound communications generated based on the plurality of outbound contact records in the attempt group;

determine that no further agents are available having an associated agent profile comprising the characteristic matching the at least one first demographic indicator;

determine another agent is available from among the plurality of available agents wherein an another agent profile associated with the another agent does not comprise the characteristic optimally matching the at least one first demographic indicator; and connect the another one of the originating outbound communications with the another agent.

15. The computer readable medium of claim 11, wherein the instructions further cause the processor to:

receive a list of outbound contact records and a priority origination matrix;

generate a plurality of ordered outbound contact record lists for a corresponding plurality of contiguous time periods using the list of outbound contact records and the priority origination matrix, wherein each of the ordered outbound contact record lists comprises an ordered sequence of outbound contacts based on the list of outbound contact records for a respective time period;

schedule one of the plurality of ordered outbound contact record lists for a time period;

select the ordered sequence of outbound contact records from the one of the plurality of ordered outbound contact record lists during the time period; and originate the outbound communications using the one of the plurality of ordered outbound contact record lists during the time period.

16. An outbound dialer for associating an outbound communication with an agent in an outbound contact center comprising:

a processor configured to receive a list of outbound contact records, wherein each contact record indicates a respective contact telephone number and is further associated with a respective contact party profile, wherein at least one of the contact records is associated with a contact party profile comprising at least one first demographic indicator, determine an available agent from among a plurality of available agents in the contact center, wherein the available agent is not presently engaged in an outbound communication, determine an agent profile associated with the available agent, wherein the agent profile comprises a characteristic matching the at least one first demographic indicator, select a plurality of outbound contact records from the list of outbound contact records to form an attempt group, wherein the selection is based on each contact party profile of the respective selected plurality of outbound contact records comprising the at least one first demographic indicator matching the characteristic of the agent profile, originate outbound communications for the available agent, wherein the outbound communications are generated based on the plurality of outbound contact records in the attempt group, determine a right party connect is established that is associated with one of the outbound communications generated based on the plurality of outbound contact records in the attempt group, and connect the one of the outbound communications to the available agent.

17. The outbound dialer of claim 16, further comprising:

a memory storing a plurality of outbound contact record lists and wherein the processor is further configured to:

receive a list of outbound contact records and a priority origination matrix, generate a plurality of ordered outbound contact record lists for a corresponding plurality of contiguous time periods using the list of outbound contact records and the priority origination matrix, wherein each of the ordered outbound contact record lists comprises an ordered sequence of outbound contacts based on the list of outbound contact records, schedule one of the plurality of ordered outbound contact record lists for a time period, select the ordered sequence of outbound contact records from the one of the plurality of ordered outbound contact record lists during the time period, and originate the outbound communications using the one of the plurality of ordered outbound contact record lists during the time period.

18. The outbound dialer of claim 16, wherein the processor is further configured to:
   determine a second right party connect received associated with another one of the originating outbound communications generated based on the plurality of outbound contact records in the attempt group;
   select a second available agent from a remaining set of the plurality of available agents, wherein a second agent profile associated with the second available agent comprises a second characteristic matching the at least one demographic indicator; and
   connect the another one of the originating outbound communications with the second available agent.

19. The outbound dialer of claim 16, wherein the processor is further configured to:
   terminate all remaining originating outbound communications generated associated with the attempt group after the one of the outbound communications is connected to the available agent.

20. The outbound dialer of claim 16, wherein the processor is further configured to:
   determine an additional right party connect associated with another one of the originating outbound communications generated based on the plurality of outbound contact records in the attempt group;
   determine that no further agents are available having an associated agent profile optimally matching matched the at least one first demographic indicator;
   determine another agent is available from among a group of agents wherein an another agent profile of the another agent sub-optimally matches the at least one first demographic indicator; and
   connect the another one of the originating outbound communications with the another agent.

* * * * *